Dec. 11, 1956 W. FLOUR 2,774,052

MECHANICAL ASSEMBLY OF ELECTRONIC CIRCUIT COMPONENTS

Filed April 6, 1951 6 Sheets-Sheet 1

Inventor:
William Flour
By Hinkle, Horton, Ahlberg & Huebner
Attorneys.

MECHANICAL ASSEMBLY OF ELECTRONIC CIRCUIT COMPONENTS

Filed April 6, 1951 6 Sheets-Sheet 2

Inventor:
William Flour
By Hinkle, Horton, Ahlberg & Wupper,
Attorneys.

Dec. 11, 1956 W. FLOUR 2,774,052

MECHANICAL ASSEMBLY OF ELECTRONIC CIRCUIT COMPONENTS

Filed April 6, 1951 6 Sheets-Sheet 3

Inventor:
William Flour
By Hinkle, Horton, Ahlberg & Wupper
Attorneys.

MECHANICAL ASSEMBLY OF ELECTRONIC CIRCUIT COMPONENTS

Filed April 6, 1951 6 Sheets-Sheet 4

Inventor:
William Flour
By Hinkle, Horton, Ahlberg & Wupper
Attorneys.

MECHANICAL ASSEMBLY OF ELECTRONIC CIRCUIT COMPONENTS

Filed April 6, 1951

6 Sheets-Sheet 5

Inventor:
William Flour
By Hinkle, Horton, Ahlberg & Wupper,
Attorneys.

MECHANICAL ASSEMBLY OF ELECTRONIC CIRCUIT COMPONENTS

Filed April 6, 1951 6 Sheets-Sheet 6

Inventor:
William Flour
By Hinkle, Horton, Ahlberg & Wupper
Attorneys

United States Patent Office 2,774,052
Patented Dec. 11, 1956

2,774,052

MECHANICAL ASSEMBLY OF ELECTRONIC CIRCUIT COMPONENTS

William Flour, Chicago, Ill., assignor to Stewart-Warner Corporation, Chicago, Ill., a corporation of Virginia Application April 6, 1951, Serial No. 219,652
6 Claims. (Cl. 339—176)

My invention relates generally to improved electronic circuits, improved components therefor, and improved methods of assembling electronic circuit components into an operative electronic apparatus, for example, a multistage amplifier.

There are numerous methods at present used to assemble electronic apparatus, but in general an electronic circuit requires a tube, a tube socket, and various components, such as inductances, resistors, capacitors, and lead wires soldered to the lugs of the tube socket and to other components. In the case of subminiature tubes, the socket is not ordinarily used, but instead, the various components and conductors are soldered directly to the wires leading from the tube. In other electronic apparatus, so-called "printed circuits" are employed, wherein capacitors, inductances, resistors, and conductors are formed by printing with a conductive ink, or are formed by plating, etching, spraying, or otherwise applying a conductive material to an insulating support, usually a ceramic material. In all of these methods, a high degree of skilled labor is required, and careful and minute inspection is essential to make certain that the components are correctly connected and that there are good electrical contacts between the components and the conductors.

In accordance with the principles of my invention, such relatively slow and tedious assembly of electronic circuits is avoided, since the assembly of the electronic apparatus may be completely mechanical, that is, it is feasible to design a machine having hoppers for the various components of the circuit, and from which the components are fed mechanically and properly positioned automatically in the assembly to complete an electronic circuit such, for example, as an amplifier. This is possible because, in accordance with my invention, no soldering, welding, or other connecting bond is required, but instead, all electrical connections between components and conductors in the circuit are made by pressure contact. Because of this manner of assembly of the components, the parts may be very rapidly assembled by machine or by hand, and correlatively, the circuit components may be very easily removed and replaced should it become necessary.

The invention is of particular utility in the assembly of electronic circuits employing miniature and subminiature tubes, and in circuits designed for high frequency in which, generally speaking, the components are of small size.

It is thus an object of my invention to provide an improved mechanical assembly of electronic components.

Other objects will appear from the following description, reference being had to the accompanying drawings, in which Fig. 1 is a vertical sectional view through a portion of a mechanically assembled electronic circuit;

Figure 12:
Figure 12A:
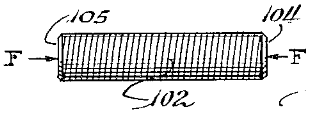
Figure 13:
Figure 13A:
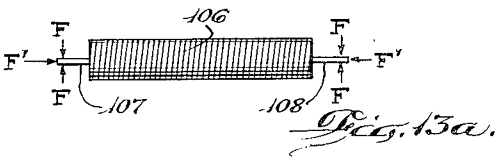
Figure 14:
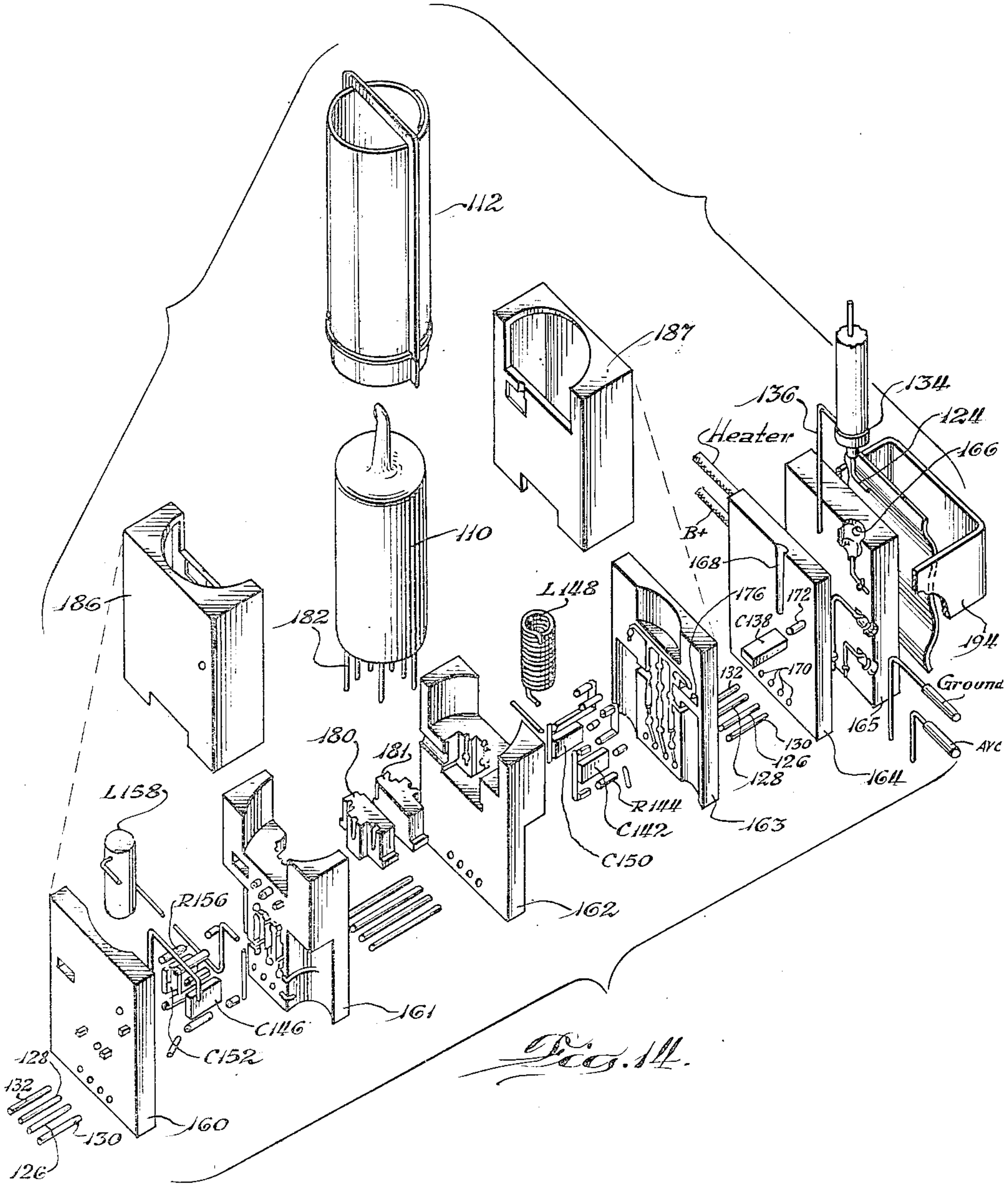
Figure 15:
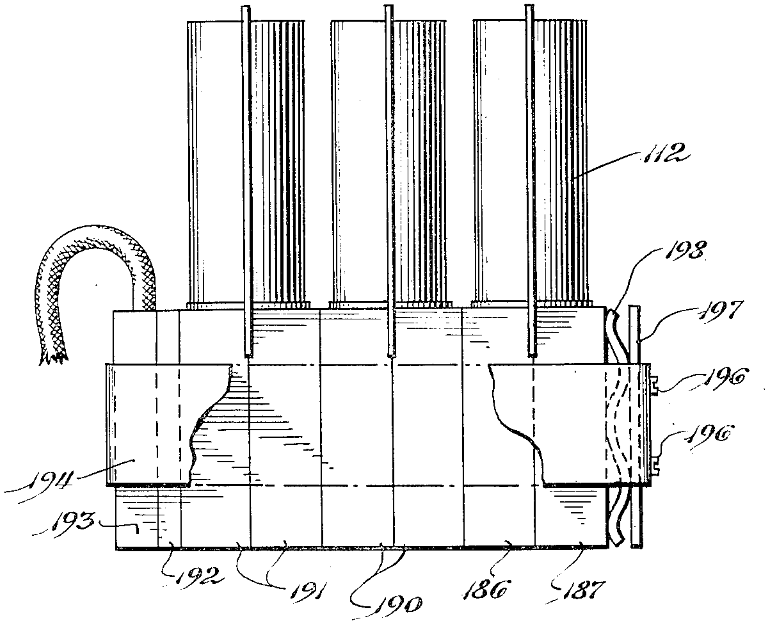
Figure 16:
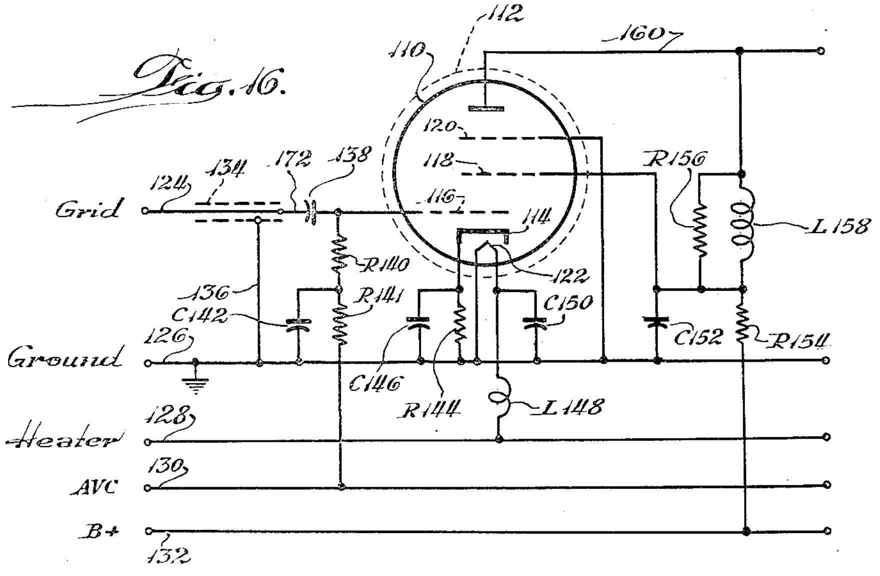
Figures 17, 18, 19, 20, 21, 22, 23:
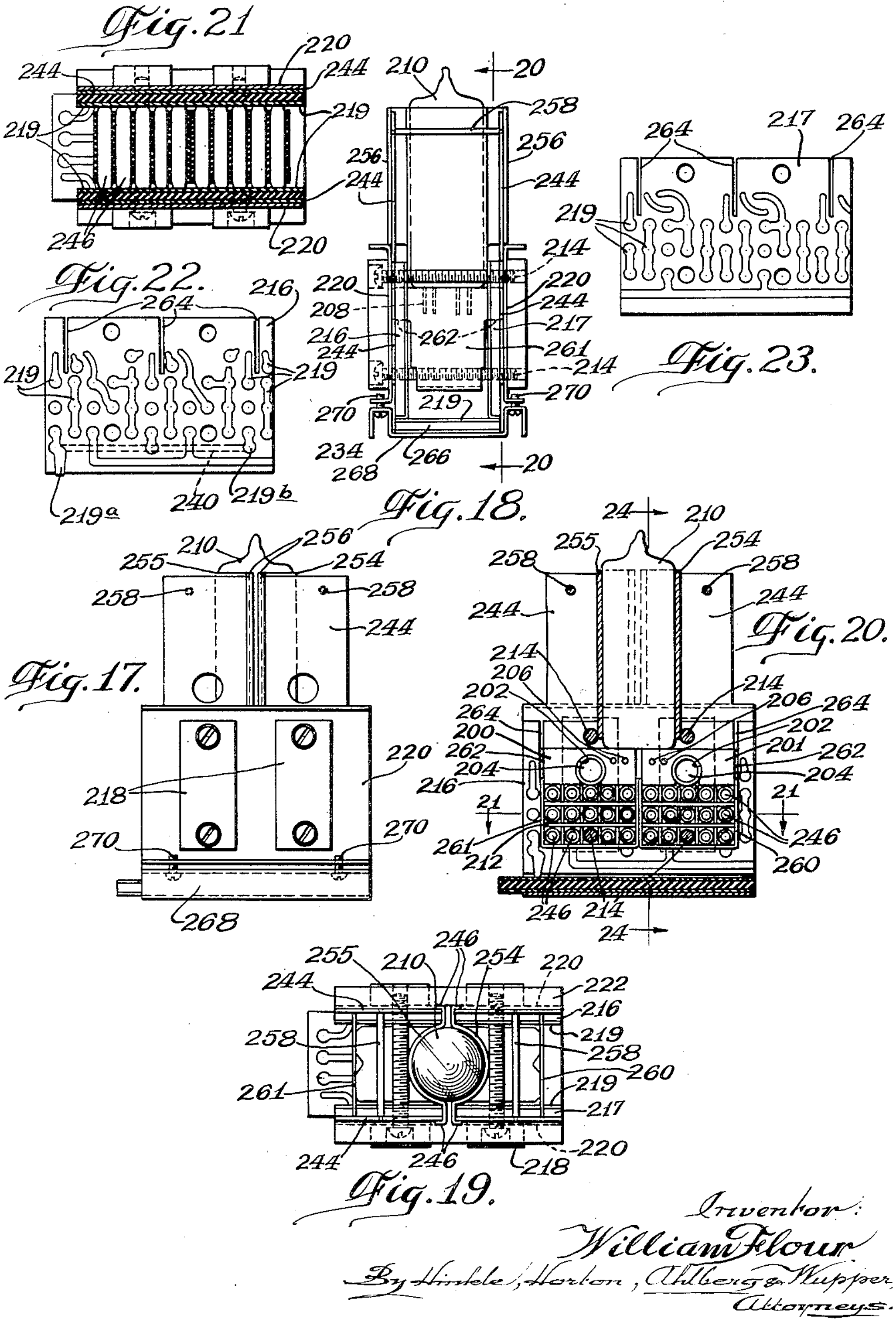
Figure 24:
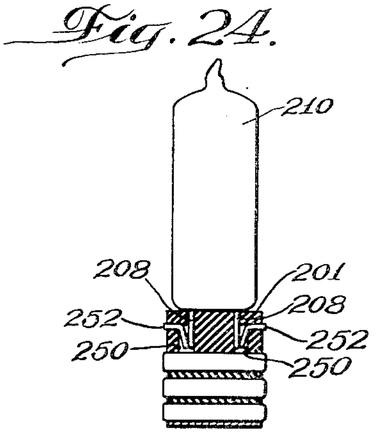
Figure 25:
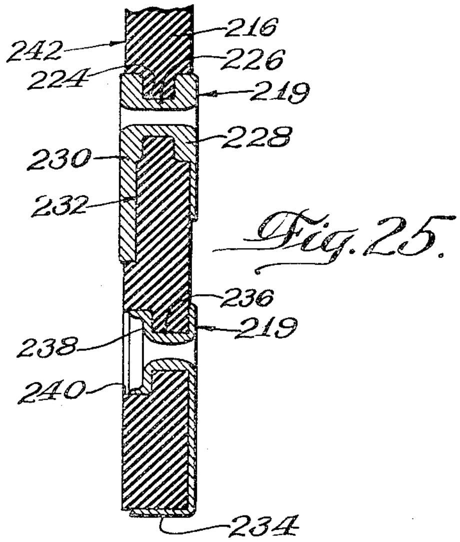
Figure 26:
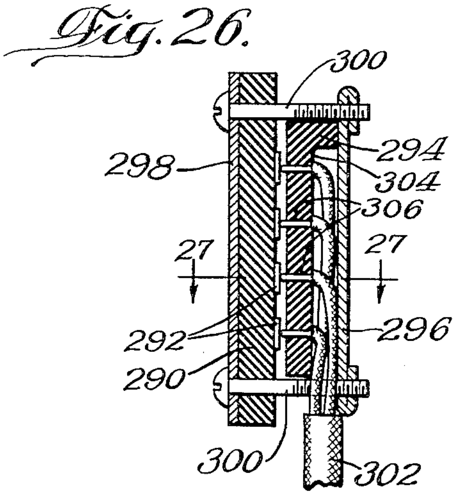
Figure 27:
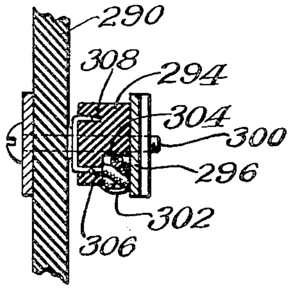
Figure 29:
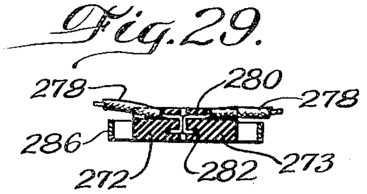
Figure 28:
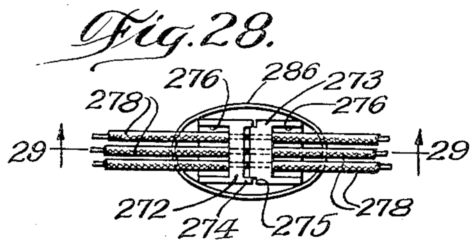

Figs. 6*a* to 11*a* are central cross sectional views of the components shown in Figs. 6 to 11, respectively;

Figs. 12*a* and 13*a* are elevational views of the components shown in Figs. 12 and 13, respectively;

Fig. 14 is an exploded view showing an illustrative mechanical assembly of electronic circuit components;

Fig. 15 is an elevational view of three stages of an electronic circuit;

Fig. 16 is a schematic wiring diagram of the electronic circuit assembly shown in Fig. 14;

Fig. 17 is a side elevation of a further modified form of the invention;

Fig. 18 is an end elevation thereof;

Fig. 19 is a plan view thereof;

Fig. 20 is a sectional view taken on the line 20—20 of Fig. 18;

Fig. 21 is a horizontal sectional view taken on the line 21—21 of Fig. 20;

Figs. 22 and 23 are elevations of the two circuitry plates employed in the assembly shown in Figs. 17–21;

Fig. 24 is a fragmentary vertical sectional view showing the manner in which connection is made to the prongs or pins of a miniature vacuum tube;

Fig. 25 is an enlarged vertical sectional view of a portion of one of the circuitry plates, showing the manner in which conductors extending through and around the edge of the insulating plate are formed;

Fig. 26 is a sectional view showing the manner in which connection is made between the ends of a multiple conductor cable and a circuitry plate;

Fig. 27 is a sectional view taken on the line 27—27 of Fig. 26;

Fig. 28 is a plan view showing the manner in which connections between multiple wire cables may be made; and Fig. 29 is a sectional view taken on the line 29—29 of Fig. 28.

Figures 1, 2, 3, 4:
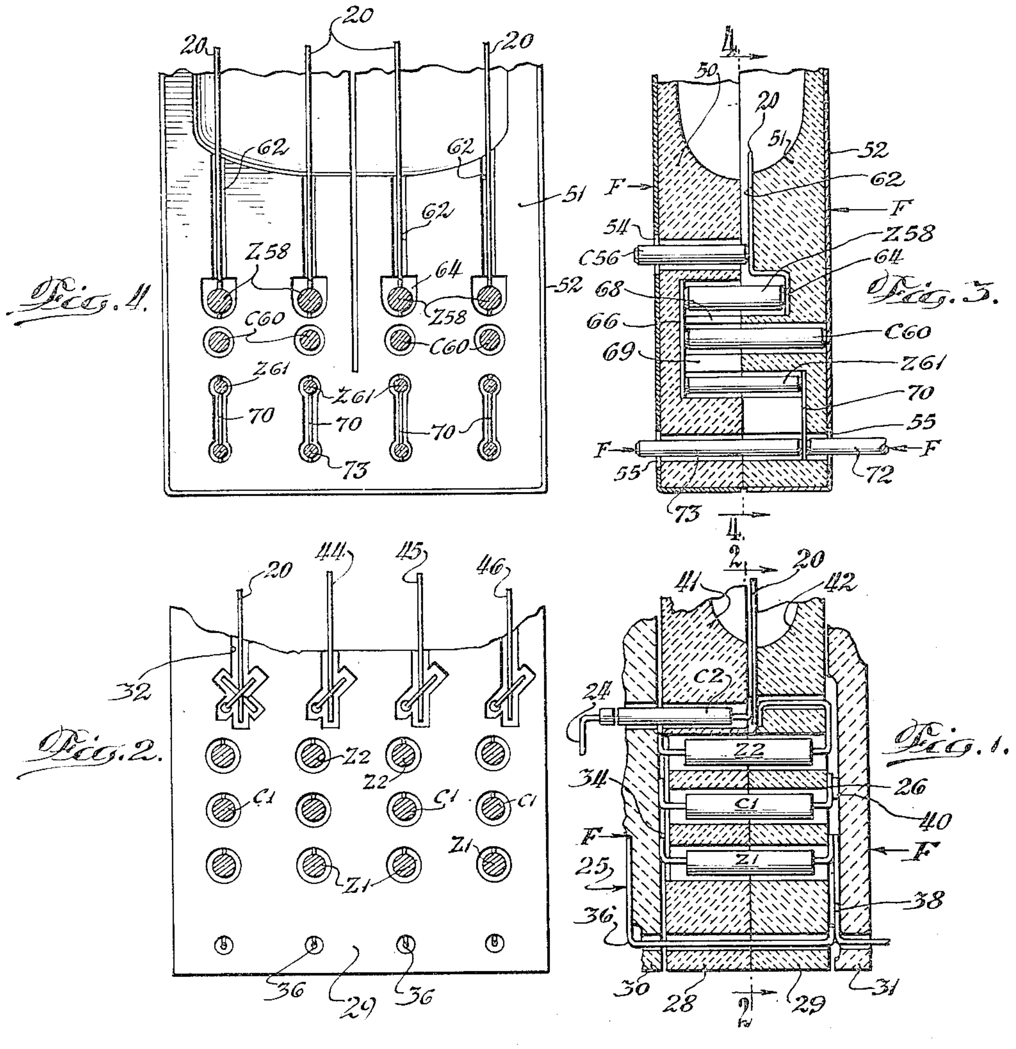
Fig. 2 is a section taken on the line 2—2 of Fig. 1.
Fig. 3 is a vertical section of a portion of an electronic circuit showing the manner of assembly using improved components.
Fig. 4 is a sectional view taken on the line 4—4 of Fig. 3.
Figure 5:
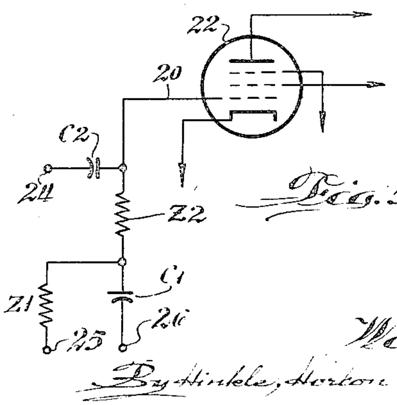
Fig. 5 is a schematic wiring diagram of a portion of an electronic circuit which is illustrated in Figs. 1 to 4.

The more fundamental principles underlying the invention are illustrated in Figs. 1 and 2 which, as previously indicated, show the components of a portion of the circuit of Fig. 5. The latter figure shows the input circuit of a pentode and comprises capacitors C1 and C2, and impedances Z1 and Z2 forming a mesh connected by a conductor 20 to the control grid of a pentode 22, and having terminals 24, 25 and 26. Figs. 1 and 2 illustrate how this mesh would be assembled mechanically using conventional impedance elements provided with the usual terminal wires. Because of the presence of extended terminal wires on the components, the advantages of the invention are only partially realized in this embodiment of the invention.

As shown in Figs. 1 and 2, the impedance elements of Fig. 5 are lodged in a cluster of elongated parallel cavities or openings formed in complementary support bodies comprising a pair of blocks 28 and 29, which are clamped together, as will appear hereinafter, by pressure applied to adjacent blocks 30 and 31 by forces applied in the direction indicated by the arrows F. These blocks 28 to 31 are preferably molded of a suitable insulating material such as a ceramic or a thermosetting plastic, but in some instances may be produced by machine tool operations. Opposed complementary surfaces formed on the support bodies provide for separation of the bodies along at least one general plane. The axes of the impedance element cavities are generally perpendicular to the plane of separation of the insulating bodies defining the cavities.

The grid lead wire 20 of a subminiature vacuum tube, extends downwardly into a groove 32 formed in the block 29 and makes contact with one terminal wire of the capacitor C2 and one terminal wire of an impedance Z2. The other terminal wire of the impedance Z2 and one terminal wire of each of the capacitors C1 and Z1, extend through openings in a conducting strip 34 lodged in a suitable recess in the block 28, and are bent over in the manner shown in Fig. 1. An angularly shaped conducting strip 36 makes pressure contact with a similar conducting strip 38, and the other terminal of impedance Z1 makes contact with the latter strip. The terminal 26 is formed by a conducting strip 40 which may extend sidewardly to provide a contact terminal for other components lodged in the block 31, or may extend beyond the edges of the blocks 29 and 31 to provide an external connection to the circuit.

The blocks 28 and 29 are preferably recessed as indicated at 41 and 42, to receive the envelope of a subminiature tube (not shown), four of the terminal wires of which are, however, shown in Fig. 2 as bearing the reference characters 20, 44, 45, and 46.

While the parts 34, 36, 38, and 40 have been described as conducting strips of metal, with the implication that they are separate parts inserted in the assembly, these parts may be in the form of conductors which are printed, sprayed, etched, or otherwise applied to the appropriate surfaces of the insulating blocks in accordance with well known techniques. It should be emphasized that no solder or other molecular bond is applied at the junctures of the various conductors, but that good electrical contact is maintained solely by pressure applied to the blocks in the direction of the arrows F.

The blocks 28 to 31, as previously indicated, are made of an insulating material, and if a thermosetting plastic is employed, pressure changes caused by expansion of the plastic, due to humidity or temperature changes, will cause increased, rather than decreased, pressure at the electrical contacts, and the forces applied to the blocks in the direction of the arrows F should be large compared with pressures which may be developed due to expansion of the elements. If the insulating material used for the blocks has a cold flow characteristic which is greater than that of the contacting conductors, it will be apparent that vibration and shock will increase the proportion of contact pressure relative to the surface pressure between the blocks. By selection of appropriate materials, possible changes in the shapes of the blocks and components should be kept low relative to those occurring as the result of the external application of clamping pressure in the direction of the arrows F.

In Figs. 3 and 4 is shown an assembly of the same electronic circuit of Fig. 5, employing improved components hereinafter to be described. In this improved form of the invention, the insulating blocks 50 and 51 are enclosed in a shield housing 52 which may substantially completely surround these blocks, but does not prevent the blocks from being clamped tightly together by forces applied in the direction of the arrows F. The shielding housing has suitable openings, such as 54 and 55, to permit coupling of the stage shown with preceding and following stages.

In the form shown in Fig. 3, the input coupling capacitor C56 corresponds to capacitor C2 of Fig. 5, but is of a type which does not have lead wires attached thereto. Instead, it has terminals at its ends which are respectively connected to the plates of the capacitor as will appear hereinafter. Likewise, the impedance Z58, which corresponds to the impedance Z2, is formed with conducting terminals at its ends. The same is true of the capacitor C60 and impedance Z61 which correspond respectively to the capacitor C1 and Z1.

The wire 20 leading to the control grid of the subminiature tube extends through a suitable groove 62 and into a recess 64 for contact with one end of the impedance Z58. The other end of the impedance Z58 is pressed against a connecting strip 66 which is located at the bottom (left-hand side) of a suitable groove formed in the block 50, the latter having slight projections 68 and 69 serving as partial supports to locate the components Z58 and C60.

In Fig. 3, the clearance around the components is exaggerated to indicate that it is very desirable to have adequate clearance for these parts to allow for tolerable variations in their dimensions, and to make certain that the pressure applied to their ends will be fully used in maintaining a good electrical contact with their end terminals.

In Fig. 3, the capacitor C60 is clamped between the shield housing 52 and the conductor 66, while the impedance Z61 is clamped between the conductor 66 and a conductor 70, the conductor 70 also making contact with a pair of interstage connector pins 72 and 73. These pins need not necessarily be made of copper, but because of their substantial diameter, may be made of any other suitable conducting metal.

Clamping pressure is applied to the assembly in the direction of the arrows F in Fig. 3, so as to maintain substantial pressure at all electrical contacts. The holes for the reception of the various components and conductors are made oversize not only for the reasons stated above, but also to facilitate the insertion of the components. It will be noted that the holes 54 and 55 in the shielding housing are made larger than the holes in the blocks 50 and 51, so as to preclude contact with the housing by the capacitor C56 and the conductors 72 and 73.

As in the previously described embodiment, the part which has been referred to as the conducting strip 66, may be in the form of an insert or may be in the form of a conducting surface printed, sprayed, or otherwise applied to the block 50. In this embodiment also, if blocks 50 and 51 are made of a thermosetting plastic, pressure changes caused by expansion of the plastic will cause increased rather than decreased pressure at the electrical contacts, and contraction will cause a reduction in contact pressure to the amount of the resilient force in the direction F. Also, the minimum pressure should be large compared with pressure which may be developed due to expansion of the elements. This holds the positions of the contact surfaces relatively independent of the local motion at the elements, and cold flow and elastic motion at the local point tends, in time, toward a condition of zero shear.

The components employed in the electronic apparatus shown assembled in Fig. 3, may assume various forms, examples of which are illustrated in Figs. 6 to 13, and 6*a* to 13*a*.

Figure 6:
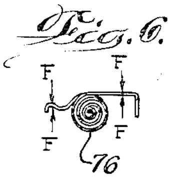
Figs. 6 to 13 are end elevational views of a number of different electronic components and conductors devised for use in the improved mechanical assembly of electronic circuit components.
Figure 6A:

Figs. 6 and 6*a* are side and end views, respectively, of a two-layer spirally wound coil as commonly employed as a radio frequency choke, the arrows F in Fig. 6 indicating the manner in which a pressure contact is made with the terminals of the coil 76. It is, of course, apparent that the pressure contact might also be made with the terminals by applying forces in a direction perpendicular to the direction of arrows F.

Figure 7:
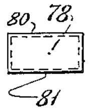
Figure 7A:
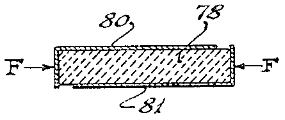

Figs. 7 and 7*a* illustrate a form of capacitor which may readily be employed in an assembly of the character shown in Figs. 3 and 4. It comprises a suitable block 78 of any suitable dielectric material, such as a ceramic, and has L-shaped coatings or strips 80, 81 of a conducting material applied thereto, it being noted that the two plates or conducting parts of the capacitor are insulated from one another and extend over the ends of the block 78 so that contact will be maintained with conductors pressed thereagainst in the direction of the arrows F.

Figure 8:
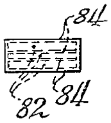
Figure 8A:
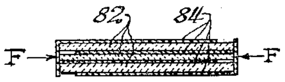

The capacitor shown in Figs. 8 and 8*a* is similar to that shown in Figs. 7 and 7*a*, except that the capacitor is made of three strips 82 of dielectric material and has four conducting layers 84 applied thereto to provide the plates of essentially three parallel capacitors, the alternating conducting layers being joined at their ends to form conducting contact surfaces against which conductors may be pressed in the direction of the arrows F to make good electrical connections. The parts may be secured together by any suitable insulating adhesive and may be covered, except at the ends, with a moisture resistant coating.

Figure 9:
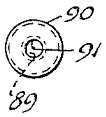
Figure 9A:
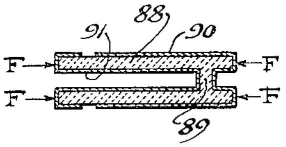

Figs 9 and 9*a* illustrate a variant form of capacitor in which the dielectric is in the form of a cylindrical tube 88 having a plug 89 secured therein or formed integrally therewith. The inner surface of the tube and the major portions of the outer surface of the tube, are covered with a suitable conductor, it being noted that the major portion of the outer coating 90 is not electrically connectd with the inner coating 91. As in the previously described embodiments, connection to other components or conductors is made by pressure applied in the direction of the arrows F.

Figure 10:
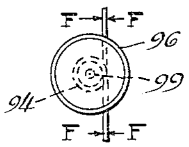
Figure 10A:
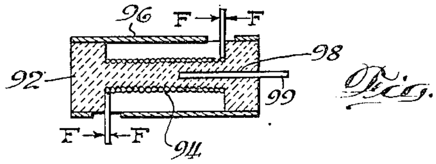

A shielded inductance element is shown in Figs. 10 and 10*a*, and comprises an insulating spool or core 92 about which a coil 94 is wound. The terminals of the coil extend through suitable apertures formed in the metallic tubular shield 96. If the inductance is to be variable, the core 92 is provided with a centrally drilled hole 98 into which a pin 99 of magnetic material (such as sintered powdered carbonyl) may be variably positioned by any suitable means.

Figure 11:
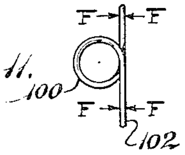
Figure 11A:
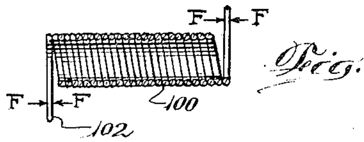

An unshielded inductance is shown in Figs. 11 and 11*a* as comprising a coil 100 having terminals 101 and 102 to which connection may be made by pressing conductors against the teminals in the direction indicated by the arrows F in Fig. 11, or the arrows F in Fig. 11*a*.

Figs. 12 and 12*a* illustrate a resistor of the customary carbon type, the body 102 of which is preferably chamfered at its ends and has a good conductor applied to its end surfaces 104, 105, so as to make a good electrical connection with any other conductor pressed against the ends of the resistor in the direction of the arrows F.

Figs. 13 and 13*a* show a conventional resistor 106 having shortened terminal wires 107 and 108 to which a good electrical connection may be made by pressing conductors thereagainst in the directions of the arrows F. If the terminal conductors 107 and 108 are cut very short, connections to the resistor may be made by pressing conductors against these terminal wires in the directions of the arrows F′, provided the conductor to which the connection is to be made has a substantial conducting area for contact with the ends of these terminal wires.

While it is to be understood that the invention is not limited to specific electronic apparatus for specific types of work, it is believed desirable to illustrate the invention further by a somewhat more complicated example of an electronic circuit which is mechanically assembled in accordance with the principles of the invention. Such more complicated circuit is illustrated schematically in Fig. 16, as comprising the automatic volume control (AVC) stage of an amplifier having a pentode 110, provided with a shield can 112, and having a cathode 114, a control grid 116, a screen grid 118, a suppressor grid 120, and a cathode heater 122. The various circuit components connect the electrodes of the pentode 110 to an input conductor 124, a grounded conductor 126, a heater conductor 128, an AVC conductor 130, and a B+ conductor 132.

The grid input conductor 124 is provided with a shield 134 which is connected to ground conductor 126 by conductor 136. The conductor 124 is connected to the grid 116 through a blocking or coupling capacitor 138, and the grid 116 is connected to AVC conductor 130 through series resistors R140 and R141, the junction of the latter resistors being connected to ground conductor 126 through a bypass and filtering capacitor C142. The cathode 114 is connected to ground through a self bias resistor R144 which has a bypass capacitor C146 connected in parallel therewith. One terminal of the heater 122 is connected to ground while the other terminal thereof is connected to the heater conductor 128 through an R. F. choke L148. The latter terminal of the heater 122 is also connected to ground through a bypass or filtering capacitor C150. The suppressor grid 120 is connected directly to grounded conductor 126, while the screen grid is bypassed to this conductor through a filtering capacitor C152. The screen grid is also connected to the B+ conductor 132 through R154, a coil L158, and an output conductor 160 in series, the coil being shunted by a resistor R156.

The circuit as above described and as diagrammed in Fig. 16, is shown physically in the exploded view of Fig. 14, and corresponding reference characters have been applied to the corresponding component parts. For example, the four conductors 126, 128, 130, and 132 find their counterparts in three groups of connectors which extend in parallel lines and the ends of which contact one another respectively, either directly or through an intermediate conductor.

In further explanation of the manner in which the schematically represented circuit of Fig. 16 is mechanically assembled, let us assume that the assembly is commenced with the rightmost block 165 of the six preformed insulating blocks 160, 161, 162, 163, 164, and 165. The block 165 may be placed upon a suitable support with its cavities uppermost and the ground and AVC terminal connections placed in the correspondingly shaped grooves formed in the face of the block 165. Similarly, the end of the input conductor 124 and the end of the shield 134 are placed in the suitably shaped cavity 166 formed in the insulating block 165. In a similar manner, the heater and B+ connections are placed in suitable recesses in the block 165. The block 164 may then be placed upon the block 165 and the grounding wire 136 for the grid input wire shield 134 placed in the vertical groove 168 formed in the block 164. Then one group of the connecting pins 126, 128, 130, and 132 is placed in the four holes 170 which extend through the block 164, so that the ends of these conductors will engage, respectively, the ends of the (thus labeled) AVC, ground, heater, and B+ wires. The capacitor C138 is connected to the conductor 124 by a suitable conductor 172 although, for the present, this capacitor may not be inserted, since it is designed to fit in a complementary opening 176 formed in block 163. This constitutes one subassembly of the complete stage.

Previously, a second subassembly was made as follows: Small insulating inserts 180, 181, were fitted within the area defined by the prongs or pins 182 of the miniature pentode 110, and the shield can 112 placed over the envelope of the pentode 110. Then the various components, such as C138, R140, C146, R144, C150, C152, R156, and L158, each of which has one terminal connected to one of the pins 182 of the tube, are inserted in the blocks 161 and 162. The shield 112 having been assembled over the pentode 110, additional suitably formed metal shields 186 and 187 are fitted over the lower end of the shielding can 112 so as to hold the latter in place. The tube 110, together with its associated shields 112, 186, and 187, is then slipped over the then brought together assembly of the blocks 160, 161, 162, and 163, to hold the latter in place. Of course, all of the other components, such as the various connectors, the resistor 154, capacitor C152, and C146, must be inserted in their complementary openings in one of the adjacent blocks before the shield assembly is finally closed over these parts.

In Fig. 14, there are a number of parts which do not bear reference characters but which, generally speaking, are conductors, although some of them are resistors which are not identified because of the complexity of the drawing. It will be understood that it is not the purpose of this description of Fig. 14 to describe in detail any particular assembly, but to illustrate representative parts and the representative ways in which they may be assembled. The details thereof are not of great significance, since such details will vary to the same extent that there are variations in electronic circuits which might be assembled by this method with substantial advantage.

After the assembly of a section or stage of an electronic circuit has been completed, it may be coupled mechanically and electrically to other similar or variant sections of the electronic apparatus, in the manner illustrated in Fig. 15. In this figure the shields 186 and 187, and the shield can 188, enclose most of the parts shown in Fig. 14 in their assembled relation. Other stages 190 and 191, together with an interconnecting block 192 and a terminal block 193, are assembled together within a closed rectangular band 194, and are compressed in assembled relation by means of a number of cap screws 196, the inner ends of which press a plate 197 against a serpentine plate spring 198 through which a relatively strong clamping pressure is maintained to hold the various stages or portions of the complete electronic circuit in fully assembled relation.

In the modified, simplified, and improved form of the invention shown in Figs. 17 to 25, the force required to maintain pressure contact between the ends of the components and the circuitry is applied transversely rather than longitudinally of the assembly. The manufacture of subassemblies, and their collection into a complete unit, is facilitated by using the method described with reference to these figures of the drawings. The subassembly illustrated comprises a pair of blocks 200 and 201 which are formed to provide openings 202 for coils 204 and apertures for conductors 206 which make contact with the pins or prongs 208 of a miniature tube 210, in this instance a pentode having seven terminals. The blocks 200, 201 rest upon two "egg crate" assemblies of insulating sheets 212, providing two groups of fifteen compartments each for the reception of various circuit components such as resistors, capacitors, and inductances. Two of these compartments are used as passageways for two of four screws 214 which are used to clamp circuitry plates 216 and 217 against the ends of the circuit components. The screws extend through reinforcing bars 218, through a flanged grounding plate 220, shielding sheets 244, the circuitry plates 217 and 216, another flanged grounding plate 222, and are threaded in reinforcing bars 224.

As best shown in Figs. 22 and 23, the circuitry plates 216 and 217, which are made of a suitable insulating material, either ceramic or plastic, have conductors 219 of various conformation thereon. The conductors of each plate are located substantially in a common plane and spaced in two perpendicular directions from each other. These conductors are preferably formed by a metal spraying operation, using a suitably apertured mask. The metal used is preferably zinc, although others of the softer metals may be employed. After the conductors have thus been formed on the plates 216 and 217, they are plated heavily with silver to increase their tensile strength. These conductors on the plates 216 and 217 are shown of exaggerated thickness in Figs. 19, 21, and 25, although they may be made of any desired thickness necessary to conduct the current in the circuit in which they are located. The conductors 219 may be applied by any other well known technique.

A number of conductors 219 extend through the circuitry plates in the manner best illustrated in Fig. 25. The plate 216 has a hole 224 and the metal is sprayed against the plate 216 from both sides, so as to produce a part 226 interconnecting the conductor 228 on the front of the plate with the conductor 230 on the rear of the plate or sheet 216. It will be noted that the hole 224 is countersunk somewhat so that the homogeneous metal which forms the conductors 226, 228, and 230 will be securely held in place. It will be noted also that the plate 216 is provided with a groove 232 for the portion 230 of the conductors, thus making this portion of greater cross sectional area. This may be done whenever one of the conductors 219 is in a circuit in which the current flow is relatively great.

Another feature of interest is shown at the bottom of Fig. 25 wherein a portion 234 of the conductor extends around the lower edge of the circuitry plate 216, extends through a suitable opening 236 in the plate, and has portions 238 lying in a longitudinal groove 240 formed at the rear of the plate 216. This groove may extend, for example, from a conductor 219*a* to a conductor 219*b* (Fig. 22). It will be understood that all, or a substantial portion, of the outer surface 242 of the plate 216 is covered with metal sprayed thereon, and that this coating on the outer surface of the plate is in direct pressure contact with the grounded shielding plate 244. Thus the groove 240, with the conductor portion 238, forms a convenient means to jump past intermediate conductors 219.

The clamping force applied by the screws 214 is sufficient to cause the chamfered ends of all the circuit components 246 to deform the conductors 219 (and 219*a* and 219*b*) so that contact will be made completely across the end surfaces of the components. It will be understood that if this high clamping force were not applied to the assembly, there would be danger that due to unavoidable irregularities in the surface of the conductors 219, or in the end surfaces of the components 246, there would either be no contact, a point contact, or limited area contact between the conductors 219 and the ends of the various components.

The components used in the modified form of invention shown in Figs. 17 to 25, must be accurately of the same length, a tolerance of minus .001, plus .004, being recommended to insure a good contact with both ends of all components. Some of the components may be steel, aluminum, or copper conducting pins whenever the circuit is of such complication as to require their use. The ends of the components should be of material harder than that used to form the conductors 219, so as to assure penetration of the ends of the components into the conductors 219 and thereby secure the full area contact previously mentioned.

The manner in which connections are made to the lead wires or pins 208 projecting from the press of the tube 210, is shown in Fig. 24. Suitable spaced holes are formed in the blocks 200 and 201 to receive these pins, the lower ends of these holes 250 being enlarged so that elbow-shaped contact wires 252 may be inserted. These contact wires 252 are preferably made of music wire or a similar resilient metal, and are biased so as to make a heavy unit area pressure contact with the pins 208. The horizontal portions of these wires 252 preferably have a press fit in the block 201 and project slightly from the side surfaces of the block 201 so that their end surfaces lie in the same plane as the ends of the components 246.

The tube 210 is provided with shielding by a pair of semi-cylindrical sheets 254, 255 which have flanges 246 along their vertical edges. These flanges project through slots in the upwardly extending portions of the grounded shield plates 244. The upper end portions of these plates 244 are biased to flex toward each other but are maintained in parallel spaced relation by suitable separator pins 258, the ends of which are of reduced diameter, and project into suitable small openings in the grounded shielding plates 244. Suitable U-shaped shields 260 and 261 are wrapped around groups of the components and have forwardly and rearwardly projecting ears 262 which project into vertical slots 264 in the circuitry plates 216 and 217 so as to maintain the parts in properly assembled relation.

In the event that a connection between seevral stages of a circuit is required, such connection may be made by clamping a circuitry plate 266 against the lower edges of the plates 216 and 217, as shown in Fig. 18, such clamping being effected by a suitably formed strap 268 of sheet metal which is clamped to the flanges of the plates 220 by bolts 270. The plate 266 is of construction similar to the plates 216 and 217, and may be utilized to provide connections between a plurality of stages of the electronic circuit, each of which may be of construction similar to the unit assembly shown in Figs. 17, 18, and 19.

Whenever units of electronic equipment are to be detachably coupled together, a coupling of the type shown in Figs. 28 and 29 may be employed. This coupling comprises a pair of insulating blocks 272, 273 which fit together due to the formation of side projections 274 on block 272, and a complementary recess 275 on block 273. Each of the block is provided with a recess 276 for the reception of insulated conductors 278 and are provided with holes 280 through which the stripped ends of the wires project. The ends of these wires are bent over in a hook shape, the extremeties thereof fitting into holes 282 formed in the block. After the wires have thus been attached to the blocks 280 they are clamped together by any suitable means so as to bring the ends of the wires into firm pressure contact. The means for accomplishing this, which is illustrated in Figs. 28 and 29, comprises a short length of seamless steel tubing 286 which is formed to be elliptical and of such internal dimensions that the two blocks 272, 273 may be pressed into the ring 286. The parts are dimensioned so that the ring or band 286 will have to be further flexed to receive the blocks 272, 273 so that when the band is released a high unit pressure will be present on the contacting ends of the wires 278.

Another way in which wires may be connected to an electronic unit assembled in the manner disclosed herein, is to provide a connector of the type shown in Figs. 26 and 27, by which the wires may be directly connected to a circuitry plate such as one of the plates 216 or 217, on the assumption that the end of the latter projects beyond the end of the sub-assembly. A circuitry plate 290 having conductors 292 thereon of the type previously described, has an insulating block 294 clamped thereto by means of a metal plate 296, a backing plate 298, and a plurality of screws 300. A four-conductor cable 302 has the insulated portions of its wires located in a rabbeted groove 304 and the stripped ends of the conductors extend through suitable holes 306 spaced along the block 294. These ends of the wires are then bent over and their extremities inserted in sockets 308. In this way the ends of the wires are securely anchored in the block 294 and by tightening the screws 300 the ends of the wires will be pressed against the conductors 292 on the plate 290 with a sufficient force to deform the conductors 292 and thereby have a substantial area of contact therewith. As in the previous illustrations, the thickness of the conductors 292 is exaggerated in Figs. 26 and 27.

Due to the nature of the invention, it is not feasible to give more than a few examples of the manner in which the large variety of electronic circuits may be mechanically assembled in accordance with the principle of the invention. However, various features of the invention may be set forth as follows:

(*a*) All circuit components are so designed, preferably without pigtail or lead wires, that electrical connection thereto may be made by pressure contact;

(*b*) Molded or otherwise formed insulating parts are provided with openings or cavities to receive all, or a substantial portion, of the components;

(*c*) Various components are held accurately in position within holes or cavities in the insulating parts, but there is preferably enough clearance about the parts so that they may be placed in the holes or cavities without difficulty, even though the size tolerances thereof are well within the practical commercial limits;

(*d*) Resistors, whether wire wound or carbon, preferably have their terminals provided by conducting surfaces at their ends;

(*e*) Wherever at all possible, connections between components and conductors are made solely by pressure contact, and without the use of any solder or similar conductive bonding agent;

(*f*) Inductance elements, where required, are wound on shielded spools with their terminals extending through openings in the shield;

(*g*) Circuit components, especially in high impedance circuits, are placed as closely as possible to the electrodes of a vacuum or similar tube;

(*h*) Where feasible, capacitors having one or more dielectric sheets, and having terminals at their opposite ends, are employed;

(*i*) Wherever it is necessary to bridge from one circuitry plate to another, a solid metal pin is employed as a conductor;

(*j*) Wherever possible, the parts are symmetrically formed so that they may be fed through a hopper device and dropped directly into the appropriate cavity in the formed insulating blocks without the necessity of handling, so that in the ultimate employment of the principles of the invention, all of the parts of an assembly, or at least of a subassembly, may be automatically assembled on a machine employing a rotatable table which has a number of index positions, or upon a linearly moving conveyor which intermittently stops at work stations, at which the components and insulating blocks may be automatically placed in correct positions. For this purpose, it is desirable that the cavities and openings in the insulating blocks shall be large enough to receive the components and connectors even though the latter are substantially oversize, but of course within easily held commercial tolerances;

(*k*) Wherever shielding of one stage or a portion of a stage from other portions, or from other stages, is required, such shields should be incorporated in the apparatus during the course of the assembly;

(*l*) All contacts between the conductors and components, or at least as many as possible, shall be made by pressure due to forces applied in the same direction;

(*m*) Shields and housings should be provided with adequately sized openings for connectors or components which must extend through the shield or housing;

(*n*) After completion of an assembly, or a subassembly, it may be coated with a moistureproof covering, but this covering should not be so heavy as to prevent the various subassemblies from being readily broken apart to facilitate service and replacement of the components;

(*o*) Wherever possible, conductors, which extend transversely to the direction in which the contact pressure is applied, should be preassembled in or on the insulating plates or blocks, and where reliability of contact is assured, such conductors (as well as resistors, capacitors, or inductances) should, if a reduction in cost may be obtained thereby, be applied by a metal spraying process, printed, painted, or otherwise applied to the insulating plastic or ceramic plates or blocks;

(*p*) Any possible cold flow of the material of which the insulating blocks are made should be in a direction to increase the contact pressure between conductors and components, rather than to decrease it;

(*q*) The final assembly or subassembly of the insulating supports with their various components in place, should be made by some means which constantly applies a clamping force to the components in a direction such that this clamping force increases the contact pressure between the components and conductors; and this clamping pressure should be sufficient to cause one of the two contacting parts to be deformed (that is, its elastic limit must be exceeded) and to allow for any deformation, or cold flow, of the insulating parts;

(*r*) Whenever the nature of the electronic circuit permits, it should be made up in units having circuitry plates clamped against the ends of circuit components of uniform length with sufficient force that the ends of the components located between the circuitry plates by insulating supports will embed themselves into the conductors on the circuitry plates to provide large contact areas. In this type of construction it is essential that the length of the circuit components and conductors which are connected between the two circuitry plates shall have their dimensions accurately maintained so that good contact under pressure will be maintained between all components and the conductors on the circuitry plates;

(*s*) The principle of solderless pressure maintained contacts is preferably employed in making necessary wire connections between more or less complete electronic units using couplers in which the stripped ends of the connecting wires are exposed against opposed surfaces of insulating blocks, and these ends of the wires maintained in firm pressure contact by clamping means which maintain the ends of the wires in contact under pressure sufficient to deform somewhat the ends of the wires;

(*t*) Connections to the prongs or pins of vacuum tubes and the like are made by providing holes for the reception of the pins in an insulating block and using elbow-shaped spring wire or the like for engagement with the pins, these wires extending to the surfaces of the block slightly beyond the circuitry plates between which the block is clamped under substantial pressure, but in apparatus in which it is not necessary to provide for possible replacement of the tube, it is desirable to obtain positive pressure contact by using short rigid conductors, one end of which is pressed against the pin of the tube and the other end of which abuts against a conductor (such as one of the conductors 119) on a circuitry plate;

(*u*) Whenever a component is insufficiently strong or rigid to withstand the clamping force applied in the assembly, it is preferably enclosed in an insulating tube the ends of which are capped by a conducting material which forms the terminals of the component;

(*v*) As far as possible, all components are made of the same diameter, as well as of the same length;

(*w*) Whenever it is essential for testing purposes, apertures are provided in the shielding enclosure and in the insulating support for the components and conductors, to permit the insertion of a testing probe.

As will appear from the following claims, it is not essential that all of these features or methods of assembly shall be incorporated in a single structure, nor would it probably be feasible. For example, the assembly may be made using tube electrodes without an envelope, and after the assembly is completed, may be inserted in a hermetically sealed container, with suitably insulated leads extending therefrom, and the container exhausted sufficiently to render the tube electrodes operative.

While I have shown and described particular embodiments of the invention and certain features of the method of mechanical assembly of electronic components of my invention, it will be understood that the embodiments shown and described constitute but a small representation of the large number of ways in which the method of my invention may be employed to assemble a nearly infinite variety of electronic circuits. In the claims, the terms "horizontal," "vertical," and "transverse," are used in their relative rather than their absolute sense.

As an example of the extent to which the overall size of electronic apparatus may be reduced, the assembly shown in Fig. 15 may have a width of one inch, overall length of about two and one-half inches, and a height, exclusive of tube shields, of about one and one-fourth inches. This novel mechanical assembly of electronic circuits thus makes it possible to reduce the size and cost of the apparatus, as well as, in many instances, increasing the efficiency and effectiveness of the apparatus by making it more compact.

I claim:

1. An electronic apparatus comprising supports of insulating material each having a plurality of vertical holes in the top thereof and parallel horizontal holes extending from the side walls of the supports to the vertical holes, an electron discharge device having terminal leads in the vertical holes of both supports, a plurality of conducting and impedance elements in the horizontal holes, said elements having terminals at the ends thereof and being of length sufficient to cause their ends to project a uniformly short distance beyond the sides of the supports, a pair of circuitry plates having conductors thereon, and means for clamping the circuitry plates against the ends of the conducting and impedance elements with sufficient force to cause deformation at the contacting surfaces thereby to increase the areas of contact.

2. An electronic apparatus comprising supports of insulating material each having a plurality of vertical holes in the top thereof and parallel horizontal holes extending from the side walls of the supports to the vertical holes, an electron discharge device having terminal leads in the vertical holes of both supports, a plurality of conducting and impedance elements in the horizontal holes, said elements having terminals at the ends thereof and being of length sufficient to cause their ends to project a uniformly short distance beyond the sides of the supports, a vertical sheet between the supports for shielding some of the conducting and impedance elements from others, a pair of circuitry plates having conductors thereon, and means for clamping the circuitry plates against the ends of the conducting and impedance elements with sufficient force to cause deformation at the contacting surfaces thereby to increase the areas of contact.

3. An electronic apparatus comprising supports of insulating material each having a plurality of vertical holes at the top thereof and parallel horizontal holes extending between the side walls of the supports, each of the vertical holes connecting with one of the horizontal holes, an electrical component having terminal leads in the vertical holes of the supports, a plurality of electrical elements in the horizontal holes, said elements having terminals at the ends thereof and being of length sufficient to cause opposite ends thereof to project a uniformly short distance beyond the sides of the supports, the electrical elements in the horizontal holes connected with the vertical holes making contact with the terminal leads of said component, a pair of circuitry plates having conductors thereon, and means for clamping the circuitry plates firmly against the terminals of the electrical elements projecting beyond the adjacent sides of the supports.

4. An electronic apparatus comprising support means of insulating material defining substantially parallel side surfaces on opposite sides thereof, said support means defining a plurality of vertical holes therein opening outwardly therefrom in generally parallel relation to said side surfaces thereon, said support means defining a plurality of parallel horizontal holes therein extending therethrough between said side surfaces in perpendicular relation to said surfaces, each of the vertical holes connecting with one of the horizontal holes, a plurality of terminal leads in the respective vertical holes, a plurality of electrical elements in the horizontal holes, said elements having terminals on opposite ends thereof and being of sufficient length to cause opposite ends of the elements to project a substantially uniform short distance beyond the respective side surfaces of the support means, the electrical elements in the horizontal holes connecting with the vertical holes making contact with the terminal leads in the latter, a pair of circuitry plates having conductors thereon, and means clamping the circuitry plates firmly against the terminals of the electrical elements at the respective side surfaces of the support means.

5. An electronic apparatus comprising, in combination; body means including central support means formed of insulating material and defining substantially parallel side surfaces on opposite sides thereof, and a pair of circuitry plates adapted to engage said respective side surfaces; said central support means defining a first series of holes therein extending between said side surfaces thereon in substantially perpendicular relation thereto, said body means defining a second series of outwardly open holes therein perpendicular to said first series of holes in said central support means, each of said holes of said second series connecting with one of said holes of said first series, a plurality of terminal leads disposed in said respective holes of said second series, a plurality of electrical elements in the holes of said first series, said elements having terminals at opposite ends thereof and being of sufficient length to locate the terminals on opposite ends of each element adjacent said respective side surfaces of said central support means, the electrical elements in said holes of said first series connecting with holes of said second series making contact with said respective terminal leads, said circuitry plates including conductors thereon located in predetermined patterns and facing the adjacent side surfaces of said central support means, and means clamping said circuitry plates firmly against the adjacent terminals of said elements at the respective side surfaces of said central support means.

6. A mechanical assembly of electronic apparatus comprising, in combination, a plurality of complementary support bodies fashioned for separable engagement along at least one general plane, said bodies being shaped to define when placed together a first series of parallel bores spaced apart in two directions parallel to said plane and having axes generally perpendicular to said plane and a second series of outwardly open bores generally parallel to said plane, each of said bores of said second series connecting with one of said bores of said first series in generally perpendicular relation to the latter, a plurality of terminal leads disposed in said respective bores of said second series, a plurality of electrical elements removably disposed in said respective bores of said first series and having electrical contacts on opposite ends thereof, said elements in said bores of said first series connecting with bores of said second series making contact with said terminal leads in the latter, means on said bodies forming a pair of two-dimension patterns of circuitry located respectively in two planes disposed at opposite ends of said bores of said first series in generally perpendicular relation to said axes thereof, and means for applying forces to said circuitry patterns in directions parallel to said axes of said bores of said first series to hold said respective circuitry patterns firmly in engagement with adjacent contacts of said electrical elements.

References Cited in the file of this patent

UNITED STATES PATENTS

| | | |
|---|---|---|
| 220,936 | McTighe | Oct. 28, 1879 |
| 1,479,315 | Pickard | Jan. 1, 1924 |
| 2,019,625 | O'Brien | Nov. 5, 1935 |
| 2,066,511 | Arlt | Jan. 5, 1937 |
| 2,119,115 | Rohnfeld | May 31, 1938 |
| 2,353,061 | Oldenboom | July 4, 1944 |
| 2,393,355 | Eppler | Jan. 22, 1946 |
| 2,431,116 | Grover | Nov. 18, 1947 |
| 2,469,569 | Ohl | May 10, 1949 |
| 2,502,291 | Taylor | Mar. 28, 1950 |
| 2,563,116 | Hultgren | Aug. 7, 1951 |
| 2,613,252 | Heibel | Oct. 7, 1952 |
| 2,638,367 | Bergan | May 12, 1953 |

FOREIGN PATENTS

| | | |
|---|---|---|
| 566,334 | France | Feb. 13, 1924 |
| 686,445 | France | July 25, 1930 |
| 688,417 | Germany | Feb. 20, 1950 |